US008676925B1

(12) United States Patent
Liu et al.

(10) Patent No.: US 8,676,925 B1
(45) Date of Patent: Mar. 18, 2014

(54) METHOD AND APPARATUS FOR PEER-TO-PEER CAPTURING AND SHARING OF VISUAL INFORMATION BASED ON INCENTIVES

(76) Inventors: Jiawei Liu, Fremont, CA (US); Shuhan Jin, Fremont, CA (US)

( * ) Notice: Subject to any disclaimer, the term of this patent is extended or adjusted under 35 U.S.C. 154(b) by 608 days.

(21) Appl. No.: 12/492,122

(22) Filed: Jun. 25, 2009

Related U.S. Application Data (63) Continuation of application No. 11/364,667, filed on Feb. 27, 2006, now abandoned.

(51) Int. Cl.
*G06F 15/16* (2006.01)
*G06F 15/173* (2006.01)

(52) U.S. Cl.
USPC ............................ 709/217; 709/223; 709/227

(58) Field of Classification Search
USPC .................. 705/14; 725/1–30; 348/200–300; 709/217, 223, 227
See application file for complete search history.

(56) References Cited

U.S. PATENT DOCUMENTS

| | | | |
|---|---|---|---|
| 5,900,909 A | 5/1999 | Parulski et al. | |
| 6,427,122 B1 | 7/2002 | Lin | |
| 6,459,990 B1 | 10/2002 | McCall et al. | |
| 6,535,243 B1 | 3/2003 | Tullis | |
| 6,636,259 B1 | 10/2003 | Anderson et al. | |
| 6,715,003 B1 | 3/2004 | Safai | |
| 6,747,690 B2 | 6/2004 | Mølgaard | |
| 6,757,684 B2 | 6/2004 | Svendsen et al. | |
| 6,927,790 B2 | 8/2005 | Chandler | |
| 6,930,726 B2 | 8/2005 | Nagai | |
| 6,967,675 B1 | 11/2005 | Ito et al. | |
| 6,982,756 B2 | 1/2006 | Nakamura | |
| 6,992,711 B2 | 1/2006 | Kubo | |
| 7,050,994 B1 * | 5/2006 | McIntyre et al. | 705/26 |
| 2005/0038813 A1 * | 2/2005 | Apparao et al. | 707/104.1 |
| 2006/0044599 A1 * | 3/2006 | Lipowitz et al. | 358/1.15 |
| 2006/0117097 A1 * | 6/2006 | Ogasawara et al. | 709/223 |

OTHER PUBLICATIONS

JEITA CP-3451, Exchangable image file format for digital still cameras: Exif Version 2.2.

* cited by examiner

*Primary Examiner* — Sun Li
(74) *Attorney, Agent, or Firm* — Invent Capture, LLC.; Samuel S. Cho (57) ABSTRACT

A method and an apparatus for capturing and sharing of visual information on a peer-to-peer basis are disclosed. Examples of visual information captured and shared from one peer to another include real-world events, people, and/or landscapes. In one embodiment of the invention, an incentive plan motivates a peer subject to capture and share desired visual information with other peers. In a preferred embodiment, a peer subject can use an image-capturing device to create visual information associated with specific metadata. In another embodiment of the invention, a peer subject can create an incentive plan for a specific set of desired metadata for visual information to motivate other peer subjects to provide visual information that satisfies the specific set of desired metadata. In one example, a metadata set can include information related to geographical location, time stamp, focal length, aperture value, shutter speed, exposure compensation, lens angle, and/or lens orientation.

15 Claims, 11 Drawing Sheets

METHOD AND APPARATUS FOR PEER-TO-PEER CAPTURING AND SHARING OF VISUAL INFORMATION BASED ON INCENTIVES

RELATED APPLICATIONS

The present invention is a continuation application to a parent application, U.S. Ser. No. 11/364,667, filed on Feb. 27, 2006 and claims priority to the filing date of the parent application, U.S. Ser. No. 11/364,667.

FIELD OF THE INVENTION

The invention present here relates to the field of capturing, delivering and sharing visual information of real world events, people, and/or landscapes guided by a peer-to-peer incentive plan creation and consumption mechanism in a real-time manner.

BACKGROUND

There are many ways for people to access visual information about a certain real-world event, person, and/or landscape. For example, printed photos on books, newspapers, photographs, television programs, motion pictures, web pages with embedded photos, and web-based photo-sharing services are some of many ways for accessing visual information on. A common characteristic of these approaches is that a publisher decides and determines how a visual information is presented. In a conventional method of presentation of visual information, visual information provided to a viewer is a reflection of a publisher's point of view rather than a point of view preferred and/or desired by a particular viewer.

Although existing video-on-demand services from cable and satellite TV providers and some web services allow customers to order and view movies and pre-recorded programs, a customer still cannot directly influence or participate in a visual-information-capturing process and select various viewpoints in a timely fashion. Furthermore, in the music industry, Napster is a widely-known example of peer-to-peer music file sharing. Services such as Napster enable a mass number of independent participants to share music files. Peer-to-peer music file-swapping services such as Napster focus on data-sharing instead of data creation demanded and/or driven by one or more peers. In addition, although web-blogging has been a popular trend in recent years due to a blogger's ability to share his or her own point of view with other peers, blog contents are not typically driven by demand of other peers and they are still a mere collection of messages accentuating the blogger's own perspective.

The conventional methods of sharing visual information do not accommodate interested consumers who want to proactively participate in a decision-making process for capturing or producing visual information of real-world events, people, and/or landscapes. Typically, the visual viewpoints of an event from an information producer or an information provider cannot be controlled, switched, or adjusted by a consumer. Because many individuals in recent years commonly carry visual-information-capturing devices such as digital cameras or cell phones with embedded camera features, a potential pool of visual information providers who may be capable of providing visual information based on a viewer's and/or a consumer's particular request, requirement, or desire is generally unutilized but very substantial.

Therefore, it may be desirable to devise a novel apparatus and a method for capturing, producing, and/or sharing visual information based on a consumer's particular requirement, desire, or request to a peer subject, which may be an individual or a business entity.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an apparatus for peer-to-peer capturing and sharing of visual information based on incentives is disclosed. This apparatus comprises a visual-information-capturing device configured to capture, create, and/or produce visual information which incorporates rich visual information metadata; a visual-information-displaying device configured to select, request, and/or display an incentive plan for the visual-information-capturing device and desired visual information transmitted from the visual-information-capturing device; an incentive service platform configured to create, produce, modify, and/or issue an incentive plan based on a peer request from the visual-information-displaying device, wherein the incentive plan is typically transmitted to the visual-information-displaying device and/or the visual-information-capturing device; and a communication network operatively connected to the visual-information-capturing device, the visual-information-displaying device, and the incentive service platform, wherein some or all of the communication network is wired or wireless and wherein the communication network is capable of transmitting digitized information.

In another embodiment of the invention, a visual-information-capturing device for peer-to-peer capturing, creating, producing, and/or sharing of visual information based on incentives is disclosed. This visual-information-capturing device comprises a visual-information-capturing block configured to capture, create, and/or produce raw visual data from an event, a person, and/or landscape; a visual metadata block comprising a metadata processing block, a metadata generator, and a visual data integration logic, wherein the visual metadata block is capable of decoding incoming rich visual metadata from an incentive plan and wherein the visual metadata block is also capable of integrating the raw visual data with rich visual metadata generated from the metadata generator; an incentive display and selection interface block capable of displaying the incentive plan and accommodating a selection related to the incentive plan; a metadata display unit capable of displaying the incoming rich visual metadata or the rich visual metadata generated from the metadata generator; and a network interface block configured to provide wireless and/or wired data transmission into and out of the visual-information-capturing device.

Yet in another embodiment of the invention, a method for peer-to-peer capturing and sharing of visual information based on incentives is also disclosed. This method comprises steps of requesting creation of an initial incentive plan from a visual information requester and/or viewer to an incentive service platform for desired visual information of an event, a person, and/or landscape; generating the initial incentive plan from the incentive service platform; transmitting the initial incentive plan to a visual information creator and/or producer who may be capable of capturing, creating, and/or producing the desired visual information; transmitting an acceptance of the initial incentive plan or a negotiation offer from the visual information creator and/or producer to the visual information requester; capturing, creating, and/or producing the desired visual information with an visual-information-capturing device by the visual information creator and/or producer; and transmitting the desired visual information to a visual information hosting service or the visual information requester and/or viewer.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of figures, procedures, logic blocks, processing, and/or other symbolic representations that directly or indirectly resemble an apparatus and/or a method for peer-to-peer capturing and sharing of visual information based on incentives. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order and do not imply any limitations in the invention.

In general, embodiments of the invention relate to capturing, creating, and/or producing visual information originally requested by a peer. Furthermore, an embodiment of the invention relates to capturing and sharing a peer-requested visual information for an incentive credit to a visual information creator and/or producer. In addition, an embodiment of the invention relates to an incentive plan which incorporates rich visual metadata which specify how a visual information requester and/or viewer would like to see requested visual information filmed by a visual information creator and/or producer. Yet another embodiment of the invention relates to incentive credit structures for an initial incentive plan and/or a follow-up incentive plan.

Furthermore, one objective of the invention is to provide an apparatus and a method which enable one peer to request a specific filming instruction in form of "rich visual metadata" for another peer wanting to film a desired visual feed for an incentive credit. A further objective of the invention is to enable this apparatus to be operatively connected to a visual information hosting service, which can function as a video storage accessible by one or more visual information requesters and/or viewers, typically for a financial incentive in form of "incentive credits" given to the visual information hosting service and an original visual information creator and/or producer. Yet another objective of the invention is to provide an apparatus and a method to produce visual information in a consumer-requested format, wherein the consumer-requested format is typically embodied by a set of "rich visual metadata" as a standardized instruction to a visual information creator and/or producer who is capable of capturing, creating, and/or producing the visual information.

Figure 1:
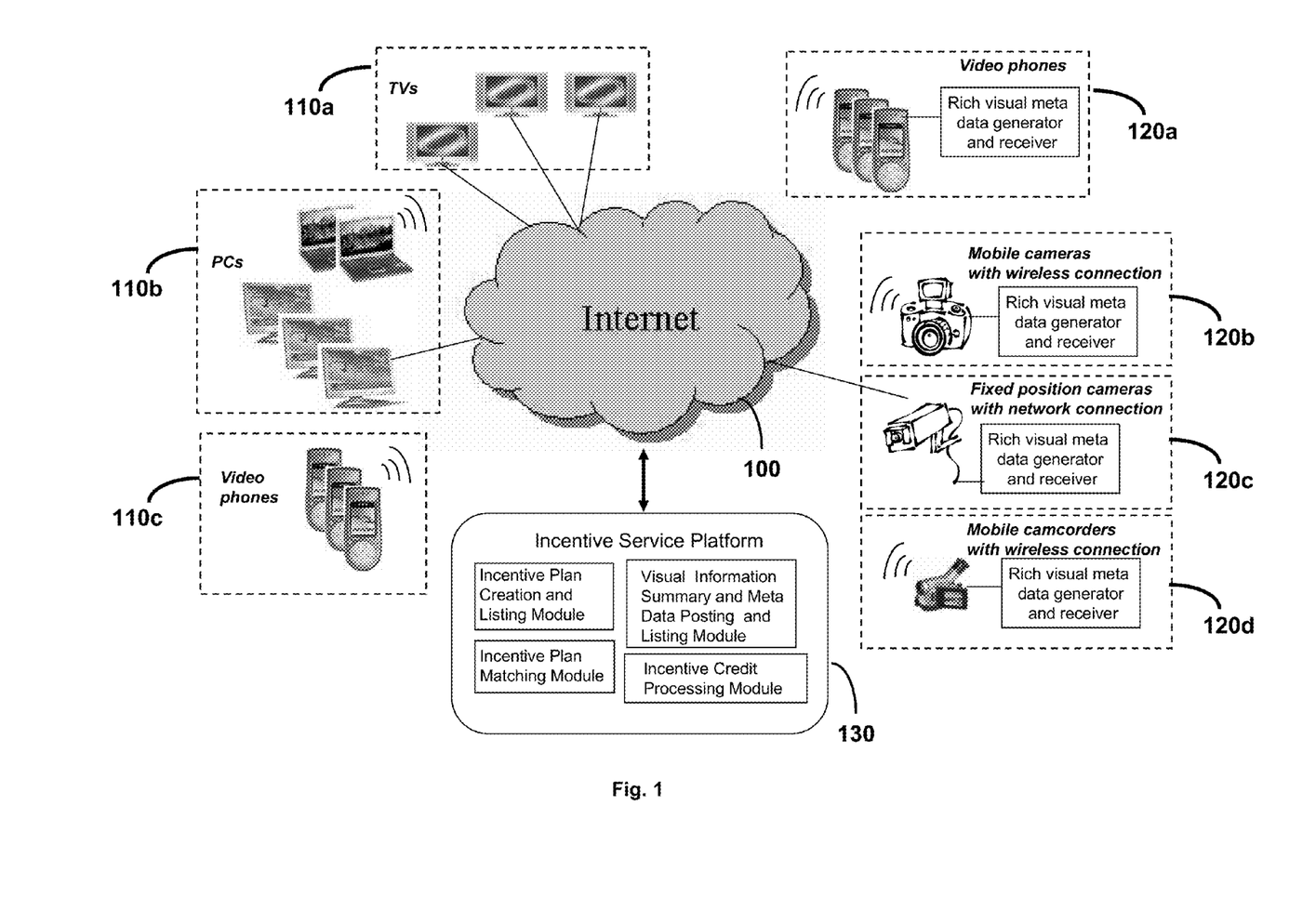
FIG. 1 shows a conceptual view of an apparatus for peer-to-peer capturing and sharing of visual information based on incentives, in accordance with an embodiment of the invention.

FIG. 1 shows a conceptual view of an apparatus for peer-to-peer capturing and sharing of visual information based on incentives, in accordance with a preferred embodiment of the present invention. In this preferred embodiment, the apparatus comprises an incentive service platform (130), a plurality of digital visual-information-capturing devices (120a, 120b, 120c, 120d), and a plurality of digital visual information display devices (110a, 110b, 110c). In one embodiment of the invention, the incentive service platform (130), the plurality of digital visual-information-capturing devices (120a, 120b, 120c, 120d), and the plurality of digital visual information display devices (110a, 110b, 110c) are operatively connected to a communication network (100) such as the Internet. In a preferred embodiment of the invention, the operative connections between the communication network (100) and the plurality of digital visual-information-capturing devices (120a, 120b, 120c, 120d) are accomplished via wireless network channels. In another embodiment of the invention, the connection between the communication network (100) and one or more digital visual-information-capturing devices (e.g. 120a, 120b, 120c, 120d) is accomplished by a wired (e.g. cable) connection. Similarly, in a preferred embodiment of the invention, operative connections between a communication network (100) and one or more digital visual information display devices (110a, 110b, 110c) are based on wireless network channels. In another embodiment of the invention, the operative connections between the communication network (100) and the one or more digital visual information display devices (110a, 110b, 110c) are based on a wired (e.g. cable) connection.

The digital visual information display devices (110a, 110b, 110c) display images generated from digital visual information received via the communication network (100). In one embodiment of the invention, these digital visual information display devices (110a, 110b, 110c) are capable of creating, submitting, creating, submitting, modifying, confirming, and/or canceling visual-information-creation incentive plans. Some examples of hardware types for digital visual information display devices include personal computers (e.g. 110b), digital televisions with an internet connection and an interactive operation interface (e.g. 110a), wireless phones with a display screen (e.g. 110c), and other handheld devices with a network connection interface, a display screen and an input interface.

Continuing with FIG. 1, one or more digital visual-information-capturing devices (120a, 120b, 120c, 120d) create visual information from a real world event, a person, and/or landscape. In a preferred embodiment of the invention, rich visual "metadata" incorporates information related to geographical location, time stamp, focal length, aperture value, shutter speed, exposure compensation, lens angle, lens orientation, moving speed of an visual-information-capturing device, and/or other factors which may be helpful in describing a particular visual information. The rich visual metadata can be utilized to describe a desired visual information by a peer subject who requests the desired visual information across the communication network (100), typically from a digital visual information display devices (e.g. 110a, 110b, or 110c) to one or more digital visual-information-capturing devices (120a, 120b, 120c, 120d). This transmission of requested metadata (e.g. rich visual metadata) enables one or more visual-information-capturing devices (120a, 120b, 120c, 120d) to adjust visual information-capturing parameters according to specific values of the metadata. The generation of rich visual metadata is further described in FIG. 3, and the rich visual metadata is further described in FIG. 4 and FIG. 5.

In one embodiment of the invention, the incentive service platform (130) is a brokerage between peer subjects who own visual-information-capturing devices (120a, 120b, 120c, 120d) and peer subjects who own visual information display devices (110a, 110b, 110c). In a preferred embodiment of the invention, the incentive service platform hosts (130) thumbnail-style version of visual information received from one or more visual-information-capturing devices (120a, 120b, 120c, 120d). These thumbnails can be associated rich visual metadata for incentive plan creations and utilizations by incentive plan issuers and information requesters and/or viewers. If an incentive plan is accepted by a visual information creator and/or producer who is willing to use a visual-information-capturing device (e.g. 120a, 120b, 120c, or 120d) and if the incentive plan is confirmed by an incentive plan issuer, then the visual information may be authorized to be transmitted from the visual information creator and/or producer to the incentive plan issuer through the communication network (100).

Continuing with FIG. 1, in a preferred embodiment of the invention, a third-party data hosting service can store a plurality of visual information creations and an information requester and/or viewer can gain access authorizations to a particular visual information creation after an incentive plans are activated via the incentive service platform (130). In another embodiment of the invention, visual information creators and/or producers can negotiate incentive plans directly with information requesters and/or viewers on a peer-to-peer basis using the third-party data hosting service. Furthermore, in one embodiment of the invention, a hosting party can be specified in an active incentive plan.

Figure 2:
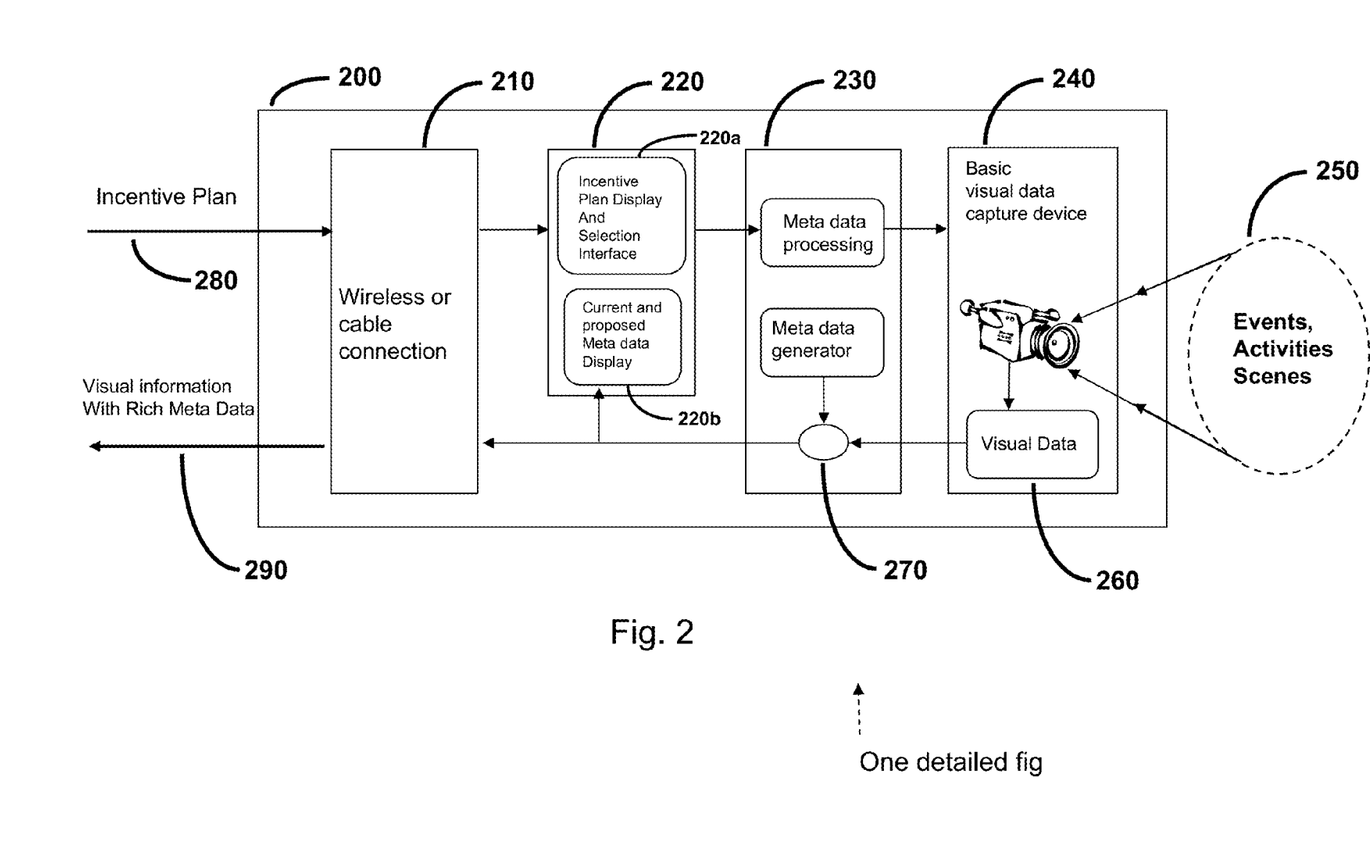
FIG. 2 shows a block diagram of an apparatus for peer-to-peer capturing and sharing of visual information based on incentives, in accordance with an embodiment of the invention.

FIG. 2 shows a preferred embodiment of a digital visual-information-capturing device (200). In one embodiment of the invention, the digital visual-information-capturing device (200) can be a video phone (e.g. 120a), a mobile camera with wireless connection (e.g. 120b), a networked fixed-position camera (e.g. 120c), or a mobile camcorder with a wireless connection (e.g. 120d). A particular event, activity, and/or landscape (250) is a source of visual information to be captured by a visual information creator and/or producer. A visual-information-capturing block (240) used by the visual information creator and/or producer can record the particular event, activity, and/or landscape (250). Then, raw visual data (260) from the visual-information-capturing block (240) can be transmitted to a visual metadata block (230). In one embodiment of the invention, a visual data integration logic (270) can associate rich visual metadata from a metadata generator of the visual metadata block (230) with the raw visual data (260). The associated raw visual data and rich visual metadata can be transmitted to a metadata display unit (220b) and a network interface block (210).

In a preferred embodiment of the invention, a network interface block (210) uses a wireless network channel to communicate with a communication network (100). In another embodiment of the invention, the network interface block (210) uses a wired cable to connect to the communication network (100). An output channel (290) of the network interface block (210) is configured to transmit the raw visual data (260) typically associated with at least some rich visual metadata to a communication network (100). Furthermore, an input channel (280) of the network interface block (210) can receive desired, proposed, and/or requested rich visual metadata. The input channel (280) of the network interface block (210) is also configured to receive an incentive plan which may incorporate at least some rich visual metadata.

Continuing with FIG. 2, in a preferred embodiment of the invention, incentive plan selections are enabled by an incentive display and selection interface block (220a). The desired, proposed, and/or requested values of rich visual metadata in available incentive plans may be checked against capabilities of a particular visual-information-capturing device. A visual-information-capturing device capable of handling most or all of the desired, proposed, and/or requested values of a particular set of rich visual metadata can accept a particular incentive plan available from a multiple number of available incentive plans. In one embodiment of the invention, a set of rich visual metadata for an accepted incentive plan can be extracted in the visual metadata block (230). In a preferred embodiment of the invention, rich visual metadata values of the accepted incentive plan are sent to the visual-information-capturing block (240). The desired, proposed, and/or requested values of rich visual metadata from an incentive plan issuer (e.g. 130) and/or a visual information requester and/or viewer (e.g. a peer using 110a, 110b, or 110c) to the digital visual-information-capturing device (200, with examples represented by 120a, 120b, 120c, and 120d) provides a standardized and intuitive way for instructing a visual information creator and/or producer to capture visual information according to the information requester and/or viewer's particular needs. In one embodiment of the invention, a visual information creator and/or producer can manually adjust the desired, proposed, and/or requested values of rich visual metadata received from an incentive plan issuer and/or an information requester and/or viewer through a communication network (e.g. 100).

Figure 3:
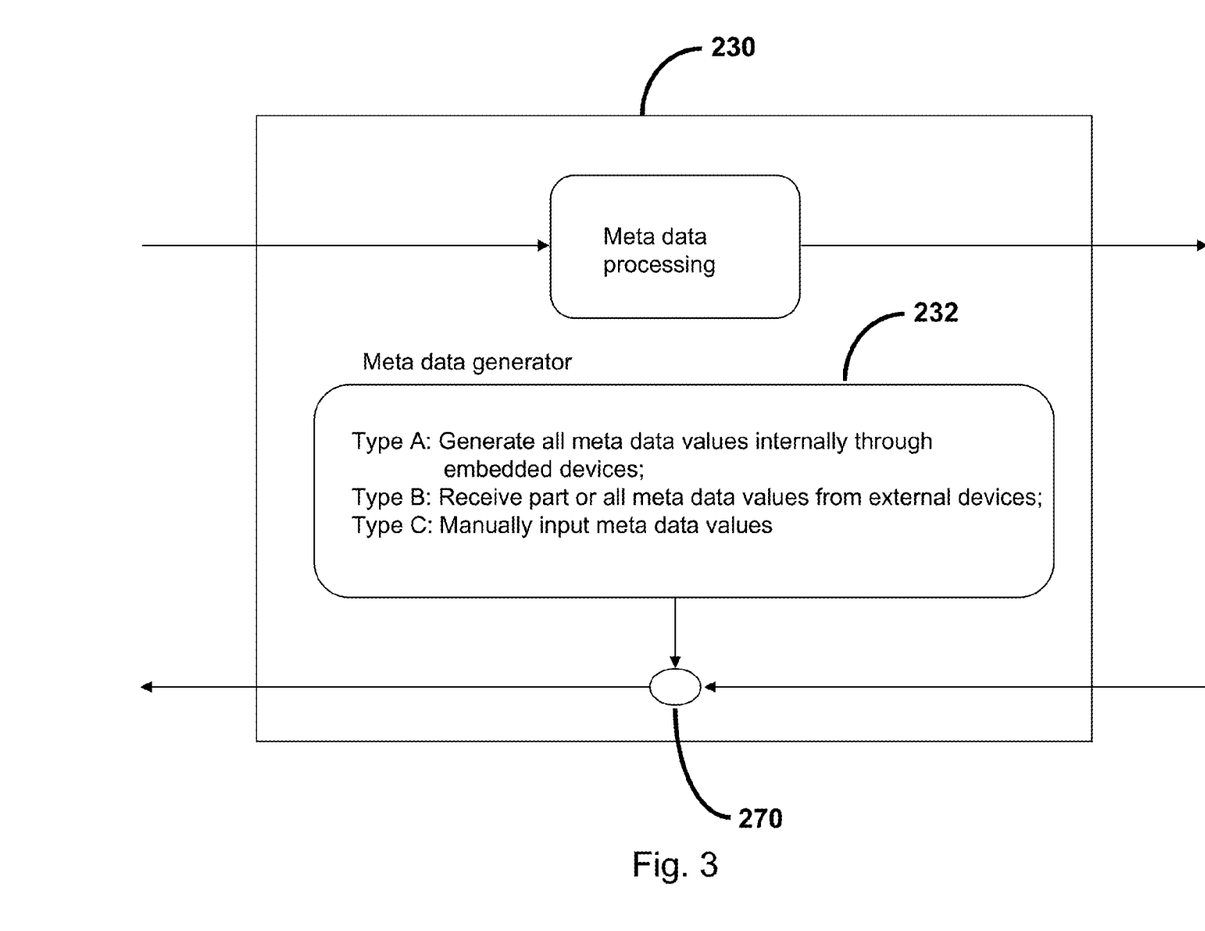
FIG. 3 shows an example of metadata generation and processing in accordance with an embodiment of the invention.

FIG. 3 demonstrates an example of metadata generation and processing in the visual metadata block (230) in accordance with an embodiment of the invention. In a preferred embodiment of the invention, rich visual metadata may be generated automatically from an embedded mechanism in a digital visual-information-capturing device (200). In another embodiment of the invention, the rich visual metadata is generated partly or all from an external device operatively connected to the digital visual-information-capturing device (200). Yet in another embodiment of the invention, the rich visual metadata is manually entered into the visual-information-capturing device (200). Rich visual metadata generated from a metadata generator (232) is typically transmitted to a visual data integration logic (270) and then sent to a network interface block (210) of FIG. 2 for communication with an incentive plan issuer (e.g. 130) and/or an information requester and/or viewer (e.g. a peer using 110a, 110b, or 110c).

Figure 4:
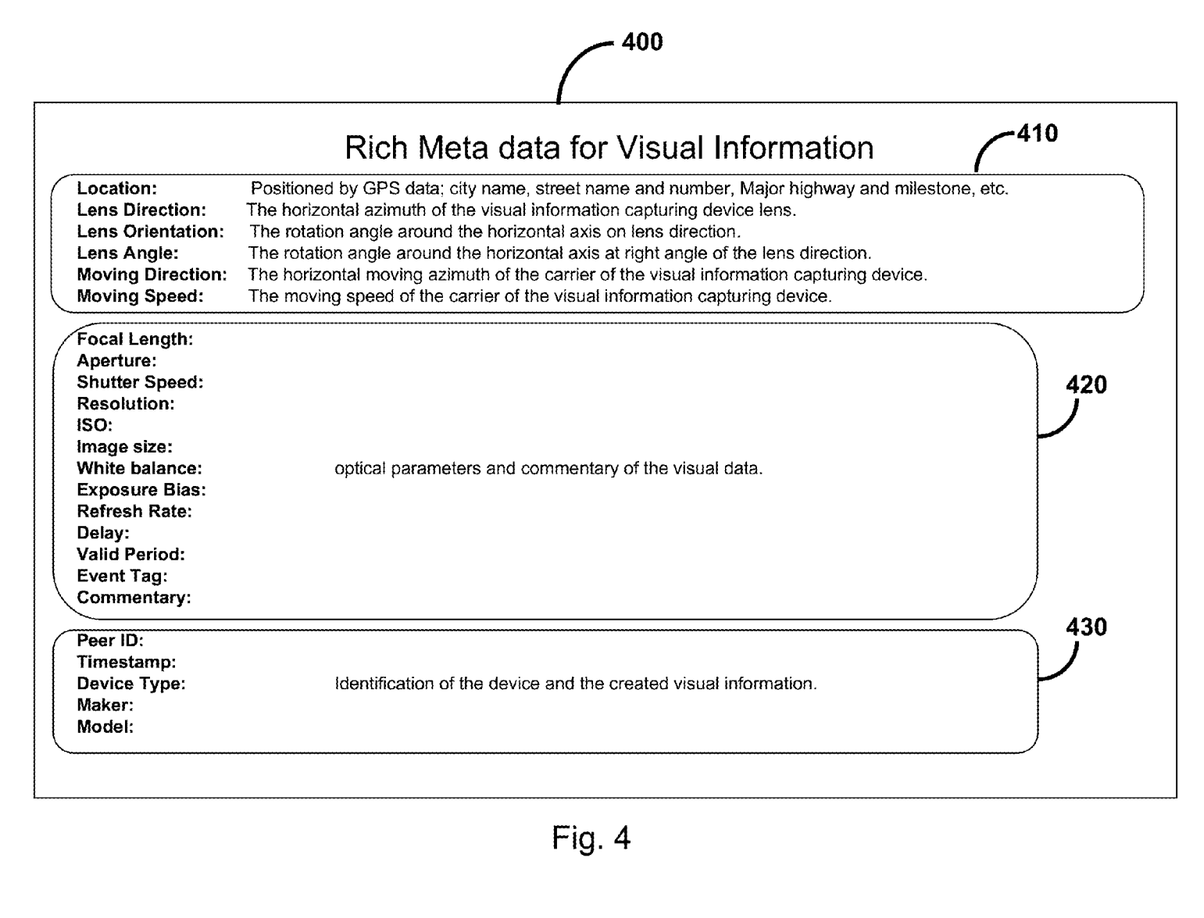
FIG. 4 shows an example of a rich visual information metadata set in accordance with an embodiment of the invention.

FIG. 4 shows an example of a rich visual information metadata set in accordance with an embodiment of the invention. This example displays a preferred embodiment of a rich visual metadata format (400) used by a visual-information-capturing device, a visual-information-display device, and an incentive service platform. In one embodiment of the invention, the rich visual metadata format (400) comprises viewpoint description data (410), optical parameter and commentary data (420), and identification data (430). In a preferred embodiment of the invention, the viewpoint description data (410) records a location coordinate (e.g. GPS data) of a visual-information-capturing device, a horizontal direction which the lens of the capturing device points to, a lens orientation, a lens rotation angle around a horizontal axis at right angle of a lens direction, and moving speed and direction of the visual-information-capturing device.

In a preferred embodiment of the invention, the viewpoint description data (410) is generated by devices comprising: a compass, a velocimeter, a gradienter, and a global positioning system (GPS) signal receiving device. In one example, these devices can be embedded into the visual-information-capturing device. In another embodiment of the invention, these devices are partially embedded and partially externally connected to the visual-information-capturing device. These devices are capable of dynamically feeding the viewpoint description data (410) to the visual-information-capturing device. When the visual-information-capturing device records a frame of visual information at a particular time, it associates raw visual data of the frame of visual information at the particular time with at least some of the viewpoint description data (410).

Continuing with FIG. 4, in a preferred embodiment of the invention, the optical parameter and commentary data (420) records values of optical parameters defined in an EXIF standard. In the same preferred embodiment of the invention, the optical parameter and commentary data (420) comprises: a refresh rate of raw visual data captured from a visual-information-capturing device, a delay between a visual information capturing time and a posting time, a valid period of access for the captured visual information, an event tag which gives out a summary of the captured visual information, and a commentary on the captured visual information.

In general, the refresh rate of raw visual data defines a time interval between two adjacent frames of the captured visual information. A reasonably high refresh rate (e.g. 15+ frames per second) enables a visual-information-capturing device to achieve a motion picture effect during playback of recorded raw visual data. The delay between a visual information capturing time and a posting time can indicate an extent of real-time nature of the posted visual information. For example, if a low value is set for this delay parameter (e.g. a few seconds), a visual-information-capturing device is effectively configured to generate a near-live broadcasting effect from the captured visual information frames. Furthermore, the commentary on the captured visual information can be in multiple formats. In a preferred embodiment of the invention, the commentary on captured visual information is in plain text. In another embodiment of the invention, the commentary on the captured visual information is embedded an associated audio file that introduces the captured visual information with sound waves, which may be synchronized with the captured visual information. Yet in another embodiment of the invention, the commentary on the captured visual information is in form of pictures, drawings, maps, or other graphical interpretations. Yet in another embodiment of the invention, the commentary on the captured visual information is a partial or complete combination of the aforementioned embodiments.

Figure 5:
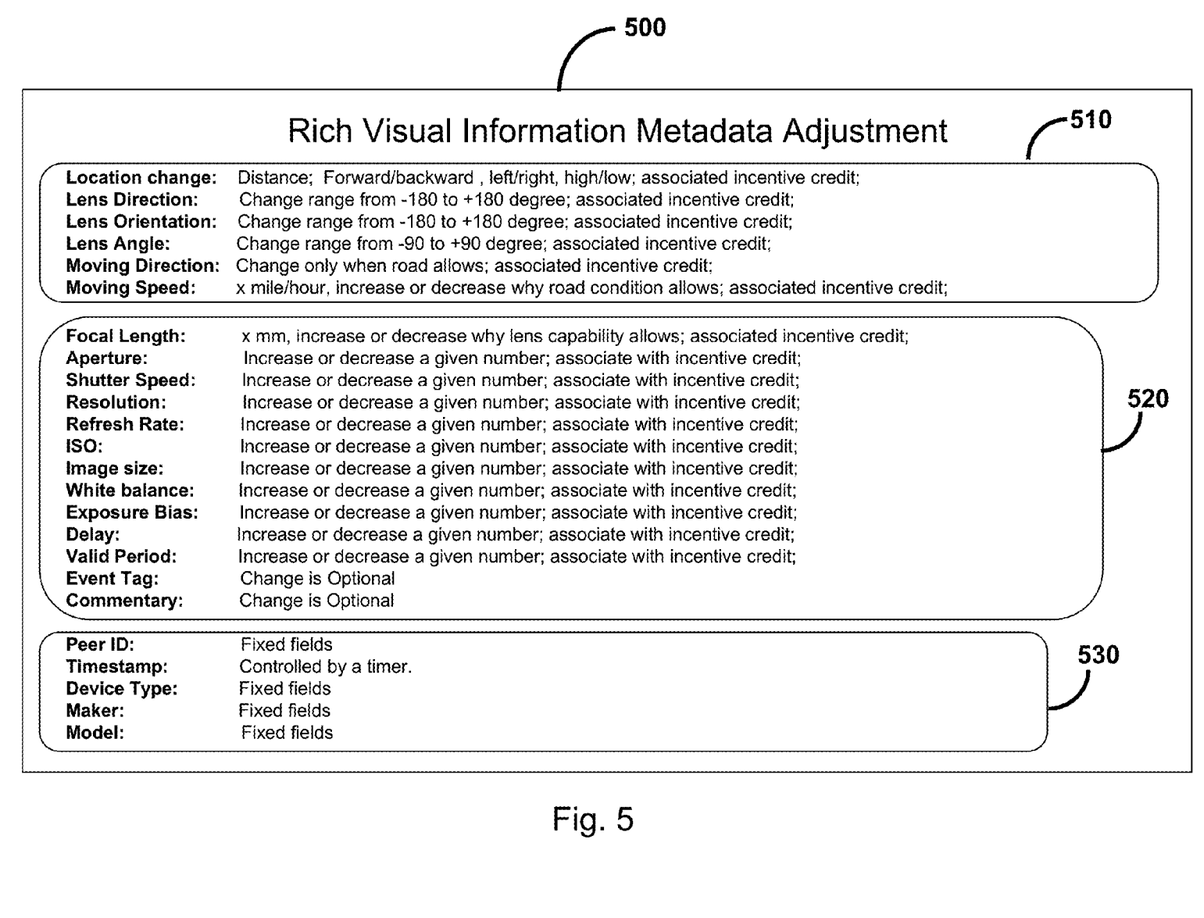
FIG. 5 shows an example of a rich visual information metadata adjustment for requests made in an incentive plan, in accordance with an embodiment of the invention.

FIG. 5 shows an example of a rich visual information metadata adjustment (500) for requests made in an incentive plan, in accordance with an embodiment of the invention. In a preferred embodiment of the invention, the rich visual information metadata adjustment (500) comprises a viewpoint description data adjustment block (510), an optical parameter and commentary data adjustment block (520), and a fixed identification data block (530). A visual information requester and/or viewer (e.g. a peer using 110a, 110b, or 110c) can associate a certain credit value on a proposed adjustment of each metadata value. Through a reasonable credit setting, the visual information requester and/or viewer is empowered with some degree of control on how desired, proposed, and/or requested visual information of a real world event, person, and/or landscape needs to be produced according to a particular requirement of the visual information requester and/or viewer. Furthermore, a visual information creator and/or producer can gain financial incentives or credit by committing to a certain incentive plan for producing visual information which meets the particular requirement of the visual information requester and/or viewer. In one embodiment of the invention, the visual information creator and/or producer can accept an incentive plan only if his or her visual-information-capturing device meets technical requirements as outlined by the rich visual information metadata.

In one embodiment of the invention, an incentive plan comprises a value set of rich visual metadata, a credit associated with a value or a value adjustment on at least one field of the rich visual metadata, an incentive plan expiration term, a credit sharing rate, and a compensation rate in case of an incentive plan abandonment before an expiration of the incentive plan. In a preferred embodiment of the invention, certain incentive plan owners are allowed to share credits coming from subsequent incentive plans with the visual information creator and/or producer.

Some examples of incentive plans include an initial incentive plan, a follow-up incentive plan, and an adjustment incentive plan. An initial incentive plan is issued for visual information or visual-information-capturing process that is defined by an incentive plan issuer. The initial incentive plan issuer incorporates requirements on a visual-information-capturing process. These requirements are defined by a certain value set of rich visual metadata. The initial incentive plan issuer submits its initial incentive plan through an incentive service platform (e.g. 130 of FIG. 1). Typically, a visual information creator and/or producer has a visual-information-capturing device capable of fulfilling the requirements of an initial incentive plan. If the visual information creator and/or producer is motivated by an associated credit, he or she can accept the initial incentive plan. Then, the visual information creator and/or producer can create visual information according to rich visual information metadata desired, proposed, and/or requested by an incentive plan and/or by a visual information requester and/or viewer.

Furthermore, a follow-up incentive plan is an incentive plan which aligns its rich visual metadata values with those from an initial incentive plan. A follow-up incentive plan can also be an incentive plan with its rich visual metadata values influenced by a rich visual metadata adjusted or defined by a visual information creator and/or producer. An adjustment incentive plan is an incentive plan with a value adjustment requirement on each value of rich visual metadata of an existing visual-information-creation process.

Figure 6:
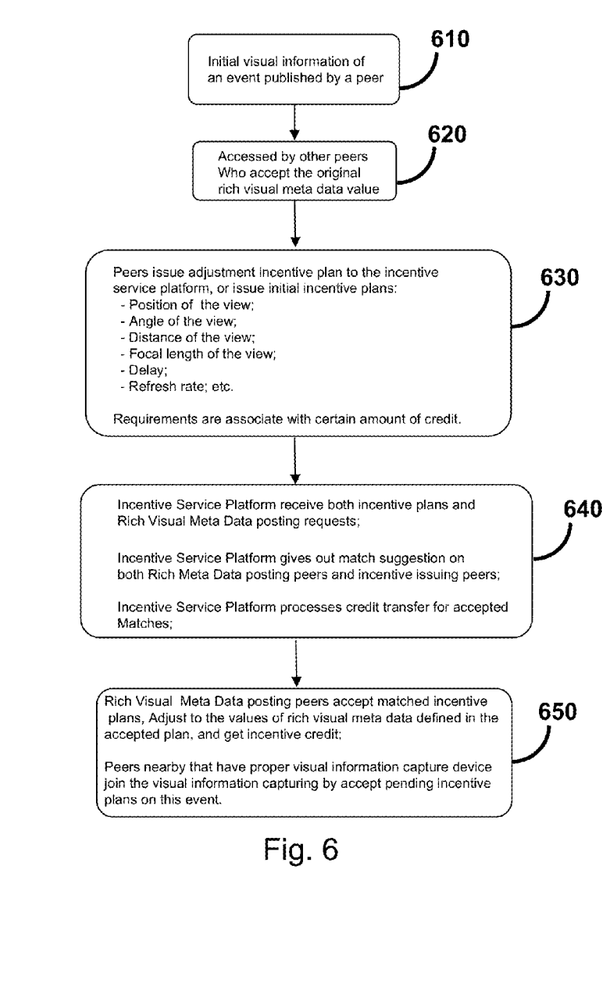
FIG. 6 shows a flow chart for an example of an incentive plan interaction with an apparatus for peer-to-peer capturing and sharing of visual information, in accordance with an embodiment of the invention.

FIG. 6 shows a flow chart for an example of an incentive plan interaction with an apparatus for peer-to-peer capturing and sharing of visual information, in accordance with an embodiment of the invention. In STEP 610, initial visual information of an event is published by a peer (i.e. a visual information creator and/or producer) who has one or more visual-information-capturing devices to capture raw visual data for the event. In STEP 620, the published visual information is accessed by one or more peer subjects who accept the original rich visual metadata values and subsequently issue a follow-up incentive plan. In STEP 630, peer subjects issue one or more adjustment incentive plans to the incentive service platform. For example, a requested adjustment on an existing incentive plan may be related to a changed viewpoint of a visual-information-capturing device, a lens angle of the visual-information-capturing device, a distance between the viewpoint and the objects, a focal length of the view, a refresh rate, and etc. If the requested adjustments are excessively deviant from the original rich visual metadata values, an initial incentive plan is used instead. In STEP 640, an incentive service platform receives both incentive plans and rich visual metadata posting requests. This incentive service platform generates incentive plan matching suggestions for incentive plan issuers and visual information creators and/or producers. In one embodiment of the invention, the incentive service platform is configured to process credit transfers for accepted plans. Finally, in STEP 650, peer subjects (i.e. a visual information creator and/or producer) who post matching or compatible rich visual metadata can accept relevant incentive plans. The peer subjects can also adjust rich visual metadata configurations of their visual-information-capturing devices to the values defined in the accepted incentive plans. These peer subjects can then begin to create and/or produce requested visual information based on one or more accepted incentive plans and subsequently receive incentive credits. Furthermore, other peer subjects nearby that have proper visual-information-capturing devices can also join the visual-information-capturing process of an identical event by accepting one or more pending incentive plans on the identical event and by subsequently producing visual information in accordance with requested rich visual metadata requirements, as defined in one or more accepted incentive plans.

Figure 7:
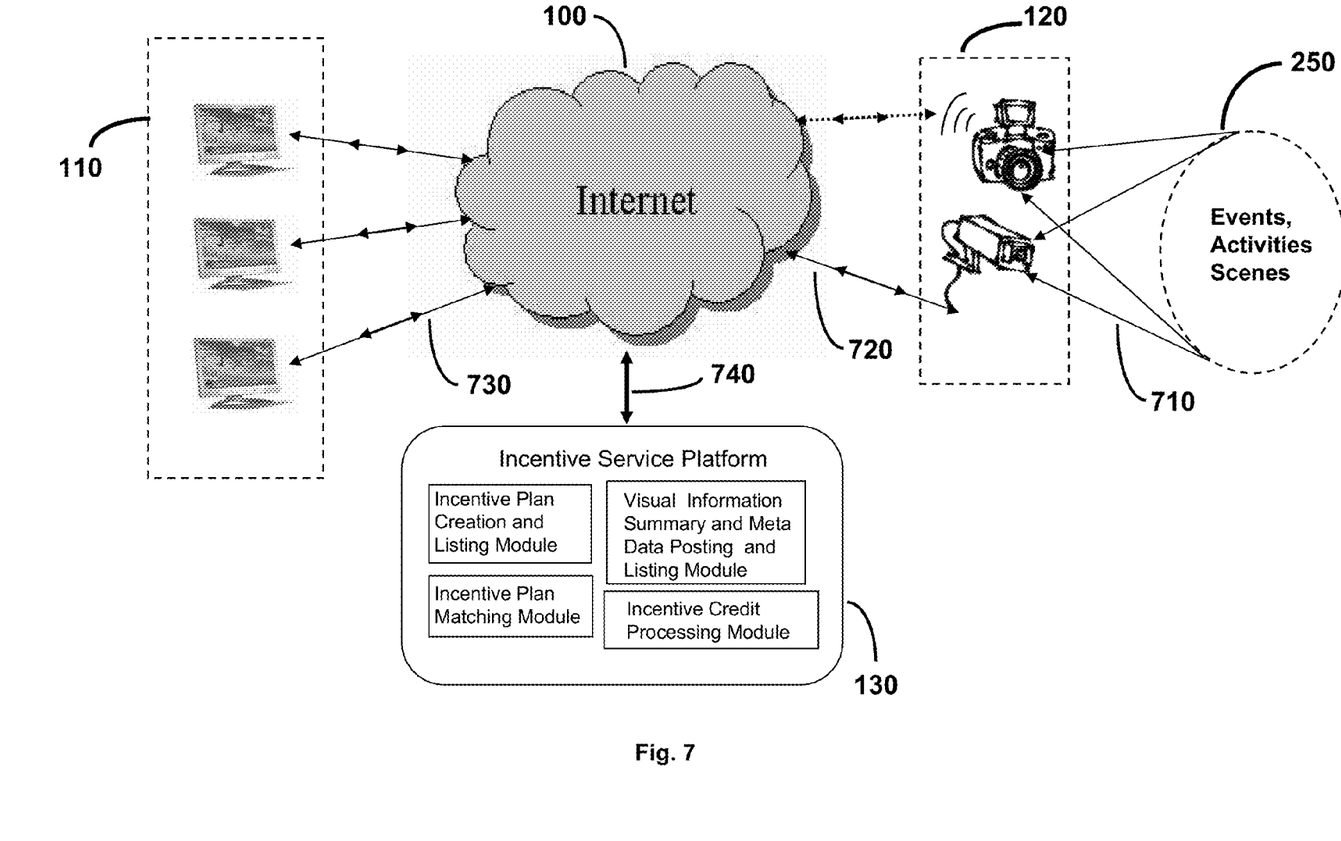
FIG. 7 shows a conceptual view of a visual information flow in peer subjects sharing visual information of an event, in accordance with an embodiment of the invention.

FIG. 7 shows a conceptual view of a visual information flow in peer subjects sharing visual information of an event, in accordance with an embodiment of the invention. In a preferred embodiment of the invention, an initial incentive plan creation can be initially requested by a visual information requester and/or viewer (110) who uses a visual-information-displaying device (e.g. 110a, 110b, 110c of FIG. 1). Then, this initial incentive plan creation request can be transmitted to an incentive service platform (130) via network connections (730, 740) and a communication network (100). Once the initial incentive plan based on the initial incentive plan creation request is formally produced from the incentive service platform (130), the initial incentive plan can be transmitted to a visual information creator and/or producer who uses one or more visual-information-capturing devices (120). Then, if the visual information creator and/or producer accepts the transmitted initial incentive plan, he or she can begin to capture visual information of a desired, proposed, and/or requested event (250). Furthermore, the captured visual information can be integrated with relevant rich visual information metadata and transmitted to a particular visual-information-displaying device via the communication network (100). In one embodiment of the invention, the particular visual-information-displaying device which receives the captured visual information is associated with the original visual information requester and/or viewer who specifically requested the received visual information in the first place by creating an initial incentive plan through the incentive service platform (130).

Figure 8:
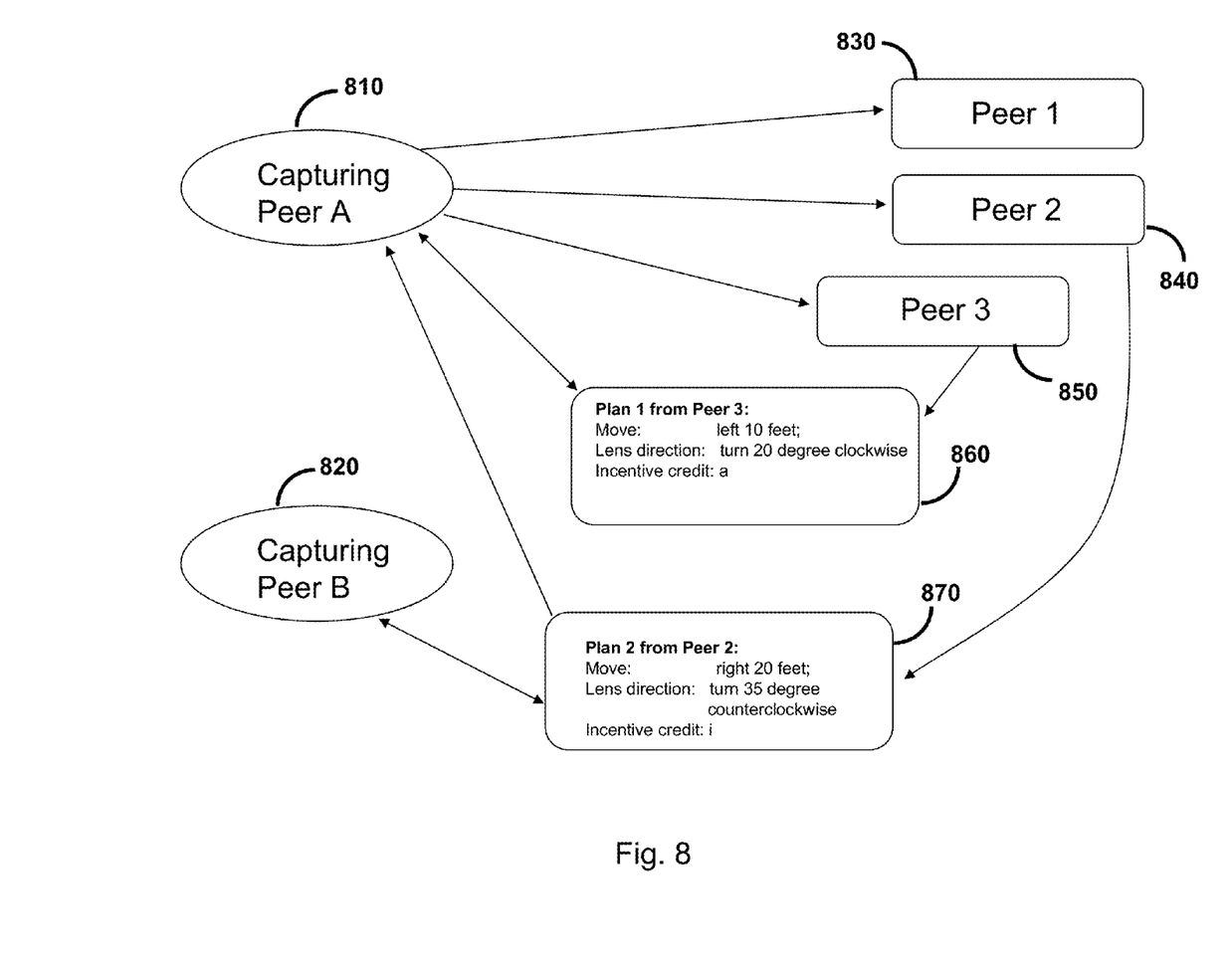
FIG. 8 shows an example of how peers participate in creating visual information for various incentive plans, in accordance with an embodiment of the invention.

FIG. 8 shows an example of how peers participate in creating visual information for various incentive plans, in accordance with an embodiment of the invention. In this particular example, there are two visual-information-capturing peers, Peer A (810) and Peer B (820), and three visual information-viewing peers: Peer 1 (830), Peer 2 (840), and Peer 3 (850). In a preferred embodiment of the invention, Peer A (810) posts rich visual metadata values to an incentive service platform (e.g. 130 of FIG. 1) for desired, proposed, and/or requested visual information. In another embodiment of the invention, a thumbnail style visual information frame is associated with the rich visual metadata values for creating an incentive plan. In one example, Peer 1 (830) accepts the rich visual metadata values by issuing a follow-up incentive plan with an associated credit value "f".

Continuing with the example above, Peer 3 (850) is not completely satisfied with the rich visual metadata values originating from Peer A (810). Therefore, Peer 3 (850) issues an adjustment incentive plan, represented as "Plan 1" (860) in FIG. 8. In one example, the adjustment requirements for the rich visual metadata values include moving the visual-information-capturing device 10 feet left from its current position and turning the lens direction 20 degree clockwise from its current direction. For Plan 1, the associated credit value is designated as "a". When Peer A (810) receives Plan 1 (860), it compares associated credit values (e.g. "a", "f", and etc.). In a preferred embodiment of the invention, if the credit value "a" is smaller than the sum of all "f"s, then Peer A (810) may decide to reject Plan 1 (860). On the other hand, if the credit value of "a" is equal to or greater than the sum of all "f"s from active incentive plans plus other potential compensations, Peer A (810) may want to start a new round of negotiation with visual information-viewing peers (e.g. 830, 840, or 850) for potentially accepting another incentive plan. In one embodiment of the invention, Peer A (810) drops visual information-viewing peers who object a new or adjusted incentive plan. Peer A (810) may also issue compensation credit back to dropped visual information-viewing peers, wherein the amount of compensation credit-back is originally defined in a dropped incentive plan. Furthermore, Peer A (810) may want to retain other visual information-viewing peers who have agreed that the new or adjusted incentive plan is acceptable. For these retained peers, Peer A (810) may want to capture visual information frames to satisfy new or adjusted metadata requirements as defined in a new or adjusted incentive plan.

Then, Peer A (810) can deliver these visual information frames to retained visual information-viewing peers (e.g. Peer 3 (850)). In another embodiment of the invention, Peer A (810) may have to acquire unanimous or largely-favorable agreements from all of active incentive plan subscribers to engage in a new or adjusted incentive plan.

Continuing with the example above, Peer 2 (840) is also not satisfied with the current rich visual metadata values. Therefore, Peer 2 (840) issues an adjustment incentive plan, or "Plan 2" (870) as shown in FIG. 8. In one embodiment of the invention, the adjustment requirements for Plan 2 (870) may include moving the visual-information-capturing device 20 feet right from its current position and turning the lens direction 35 degrees counterclockwise from its current direction. The associated credit value for this adjustment requirements is "i". In a preferred embodiment of the invention, Peer A (810) rejects Plan 2 (870) if "i" is smaller than "a". Peer A (810) can also reject Plan 2 (870) if Peer A (810) is currently processing Plan 1 (860) and cannot respond to new adjustment incentive plans. In another embodiment of the invention, Peer A (810) rejects Plan 2 (870) because the cost of switching to Plan 2 (870) is unattractive. In one embodiment of the invention, Plan 2 (870) which may have been first rejected by Peer A (810) can be queued in as a pending incentive plan for a later selection. If Plan 2 (870) incorporated relative values specific to Peer A (810), these relative values may be adjusted to absolute values for re-use by another peer. For example, a second visual-information-capturing entity, Peer B (820), may accept Plan 2 (870) because it is capable of fulfilling the particular rich visual metadata values as defined in Plan 2 (870). Then, Peer B (820) may begin to produce visual information specific to Plan 2 (870) and deliver relevant visual information to Peer 2 (840).

Figure 9:
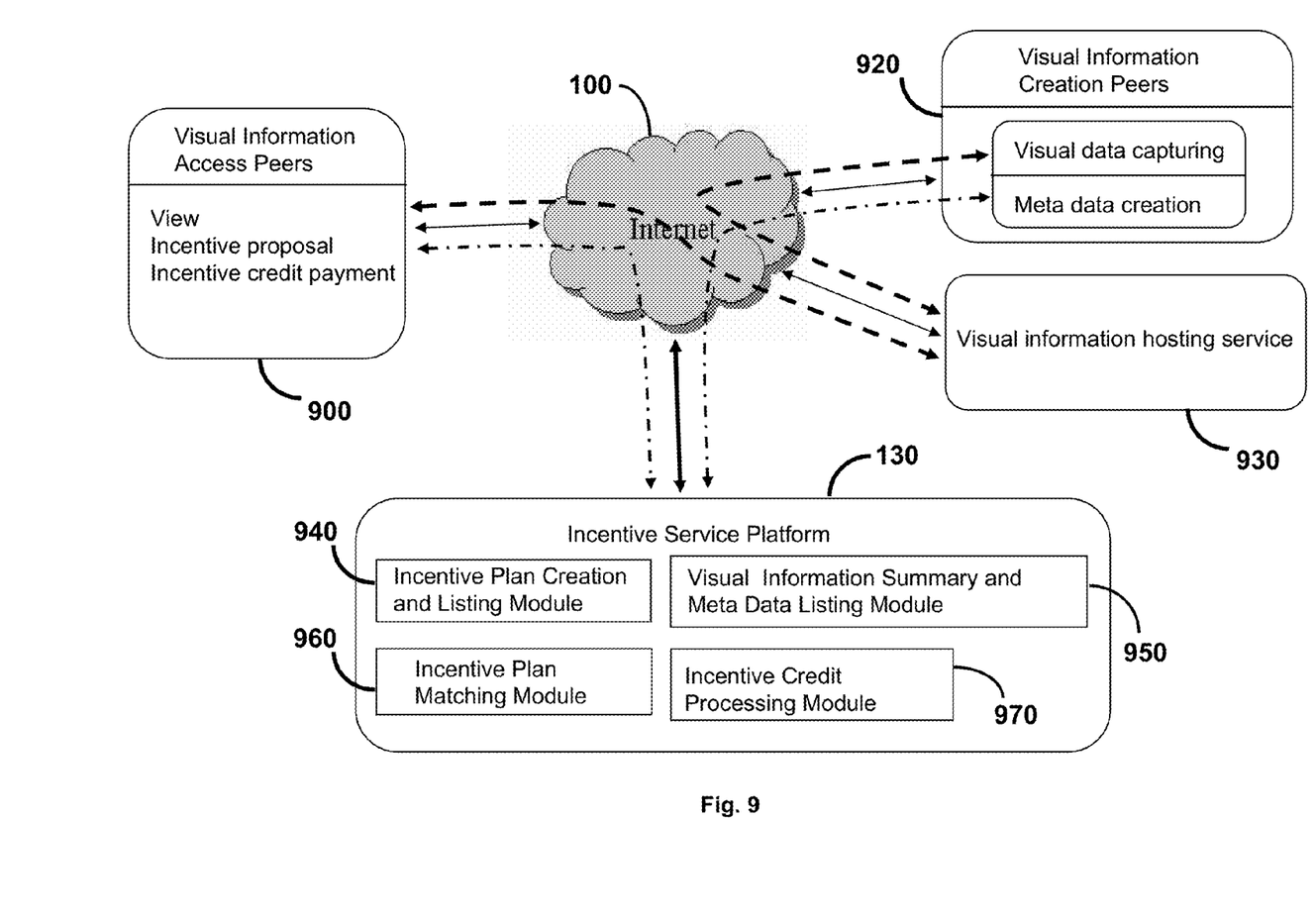
FIG. 9 shows a conceptual view of functional blocks of an incentive service platform and data flow in accordance with an embodiment of the invention.

FIG. 9 shows a conceptual view of functional blocks of an incentive service platform and data flow in accordance with an embodiment of the invention. In a preferred embodiment of the invention, the visual information is hosted by an independent visual information hosting service (930). Visual information creators and/or producers (920) can send the created visual information to a visual information hosting service (930). Visual information viewing peer subjects (900) can be authorized to access visual information frames for a certain event if the certain event is related to one or more their active incentive plans. In a preferred embodiment of the invention, an incentive service platform (130) comprises an incentive plan creation and listing module (940), a visual information summary and rich visual metadata listing module (950), an incentive plan matching module (960), and an incentive credit processing module (970). In a preferred embodiment of the invention, the incentive plan creation and listing module (940) is used in creating incentive plans and also lists active (i.e. unexpired) incentive plans. The incentive plan creation and listing module (940) also use maps, classified topic tags, timelines, and/or incentive plan search to assist incentive plan creators in identifying incentive plan targets. In one embodiment of the invention, an incentive plan target may be real world events, incidents, people, and/or landscapes which can be presented with visual information frames.

Continuing with FIG. 9, in a preferred embodiment of the invention, the visual information summary and rich visual metadata listing module (950) can provide visual information creators and/or producers a summary of their captured visual information and associated rich visual metadata. Furthermore, in a preferred embodiment of the invention, the incentive plan matching module (960) generates incentive plan matching suggestions to both incentive plan issuers and visual information creators and/or producers by utilizing the incentive plan creation and listing module (940) and the visual information summary and meta data listing module (950). In a preferred embodiment of the invention, the suggested matches may be derived from geographical proximity calculations. In another embodiment of the invention, the suggested matches come from a similarity matching scheme of tags in incentive plans and in visual information summaries. Yet in another embodiment of the invention, incentive plans include a list of desired peer ID's from visual-information-capturing devices and/or visual information creators and/or producers. Visual information-viewing peer subjects (900) may prefer to see peer ID's in a list to conceptualize a potential pool of visual information creators and/or producers categorized by specific incentive plans. Yet in another embodiment of the invention, the visual information creators and/or producers (920) have a list of desired incentive plan issuers or visual information-viewing peer subjects (900). In one embodiment of the invention, when there is a match between an incentive plan and a visual-information-capturing device, an incentive plan issuer (i.e. directly or indirectly controlled by a visual information-viewing peer subject) and a visual-information-capturing device will start to negotiate plan details. In a preferred embodiment of the invention, they will automatically negotiate rich visual metadata values, ranges, credit values, plan expiration terms, credit sharing rates, and compensation rates for abandoned incentive plans. In one example, after an incentive plan is accepted by a visual-information-capturing device, the incentive credit processing module (970) executes a credit transfer from the incentive plan issuer to the visual information creator and/or producer who accepted the incentive plan. The incentive credit processing module (970) can also execute a credit sharing agreement on follow-up incentive plans.

Figure 10:
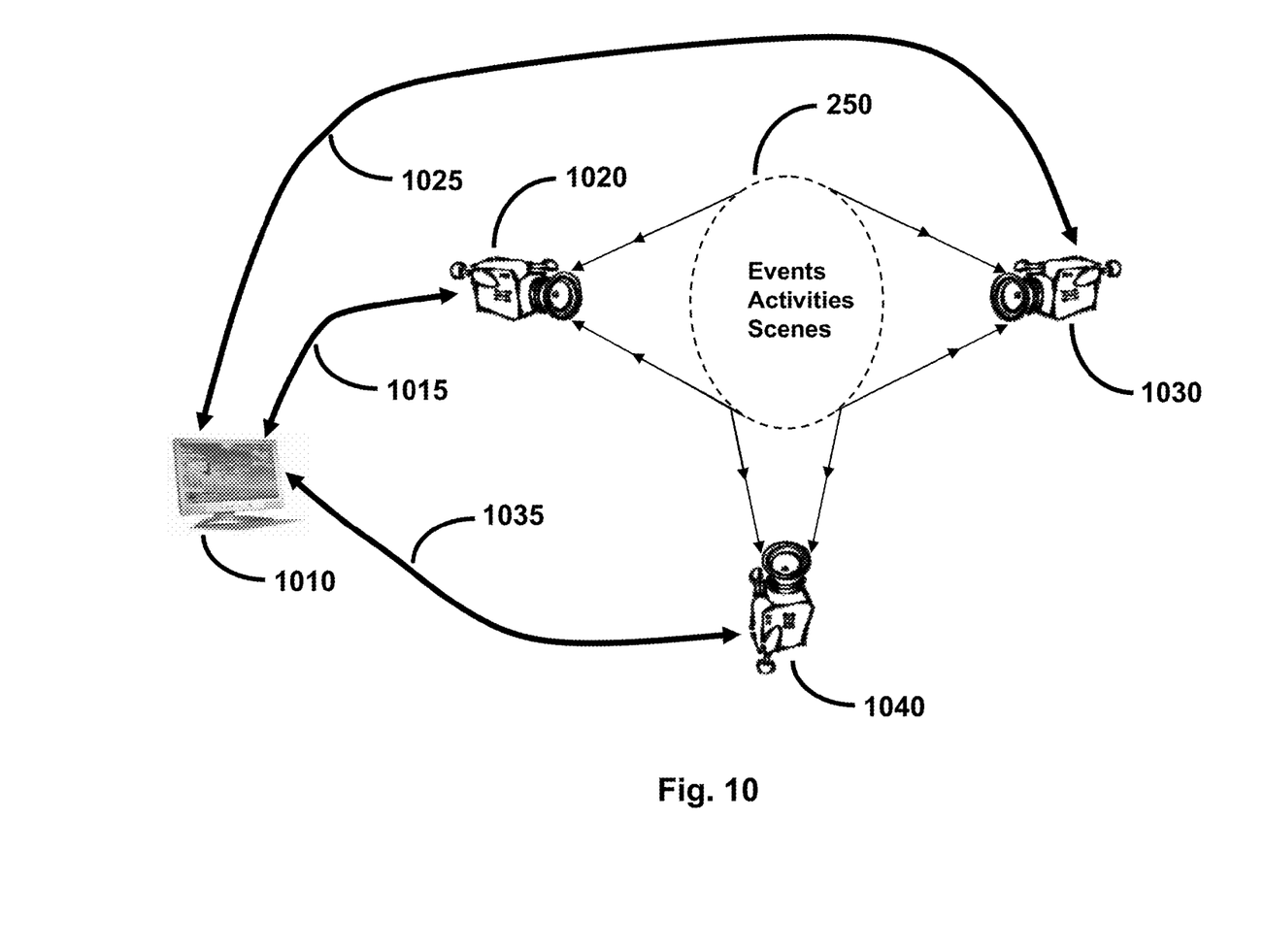
FIG. 10 shows an example of how a peer participates in capturing visual information from multiple viewpoints while getting involved in various incentive plans, in accordance with an embodiment of the invention.

FIG. 10 shows an example of how a peer participates in capturing visual information from multiple viewpoints while getting involved in various incentive plans, in accordance with an embodiment of the invention. In this example, an incentive plan issuer (1010) wants to view an event (250) from a multiple number of viewpoints. The incentive plan issuer (1010) requests issuance of a first incentive plan (1015). In one embodiment of the invention, the first incentive plan (1015) is at least partially produced by an incentive service platform (e.g. 130 of FIG. 1), and the first incentive plan (1015) is accepted by a first visual information creator and/or producer (1020). The first visual information creator and/or producer (1020) begins to capture visual information of the event (250) from a west side of the event (250) as specified by the first incentive plan (1015). In addition, the incentive plan issuer (1010) also directly or indirectly sends a second incentive plan (1025). The second incentive plan (1025) is accepted by a second visual information creator and/or producer (1030). The second visual information creator and/or producer (1030) then starts to capture visual information of the event (250) from an east side of the event (250) as specified by the second incentive plan (1025). Moreover, the incentive plan issuer (1010) also directly or indirectly sends a third incentive plan (1035). The third incentive plan (1035) is accepted by a third visual information creator and/or producer (1040). The third visual information creator and/or producer (1040) then starts to capture visual information of the event (250) from a south side of the event (250) as specified by the third incentive plan (1035).

Figure 11:
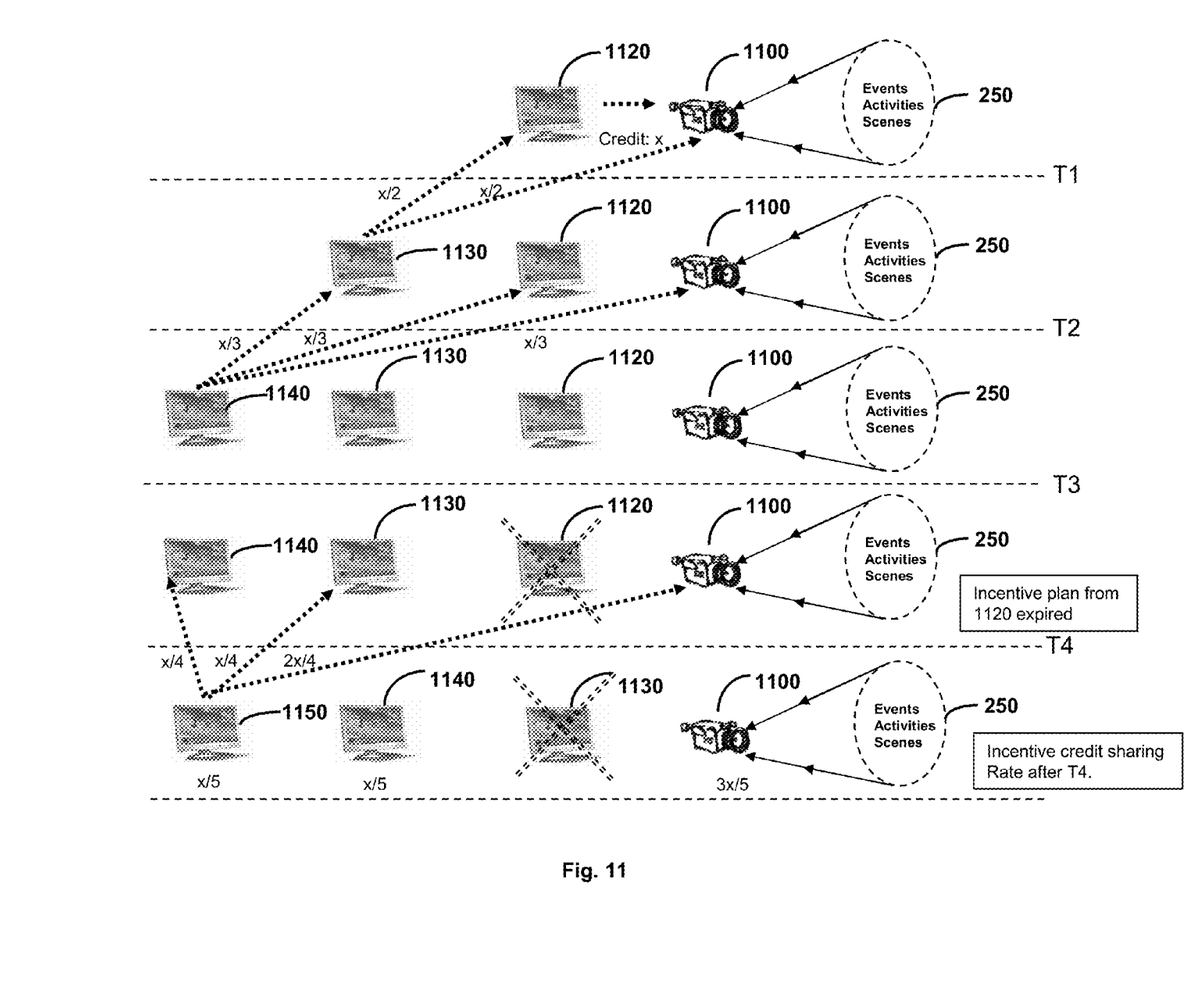
FIG. 11 shows an example of an incentive credit processing in accordance with an embodiment of the invention.

FIG. 11 shows an example of an incentive credit processing in accordance with an embodiment of the invention. In one embodiment of the invention, an incentive plan is defined as a proposal that motivates visual information creators and/or producers to capture visual information requested or preferred by one or more visual information requesters and/or viewers. In at least some peer-to-peer applications, this approach may also have a benefit of reducing a visual information creator's and/or producer's bias of how visual information is presented to viewers. A variety of incentive plans may motivate many visual information creators and/or producers to provide a viewer-requested events, people, or landscapes. In a preferred embodiment of the invention, an incentive plan may incorporate an concept of time-defined or event-defined expiration and a concept of credit sharing with other peers. These concepts may help to achieve a high level of participation to peer-to-peer capturing and sharing of visual information based on incentives. They can also inspire a close cooperation between visual information requesters/viewers and visual information creators/producers.

The example of an incentive credit processing as shown in FIG. 11 embodies an initial incentive plan, which comprises a rich visual metadata value set, a total credit value of this plan, a plan expiration condition term, a credit sharing rate, and a compensation rate for interruption or deactivation of an incentive plan. In this particular example as shown in FIG. 11, the initial incentive plan from a first visual information requester/viewer (1120) has a credit value "x". There may be a potential plan expiration condition to the initial incentive plan, such as "the initial incentive plan expires after two follow-up incentive plans to the original incentive plan." Continuing with the particular example as shown in FIG. 11, the credit sharing rate can be set to the following terms: a visual information creator/producer (1100) gets 100% of the credit value from the first visual information requester/viewer (1120) based on the initial incentive plan at a first stage (T1). The initial incentive plan can also outline that if there is a subsequent visual information requester/viewer (e.g. 1130) after the first stage (T1), then the first visual information requester/viewer (1120) shares subsequently-generated credit values with the visual information creator/producer (1100), as shown at a second stage (T2) in FIG. 11. In one embodiment of the invention, follow-up incentive plans are automatically generated each time when a subsequent visual information requester/viewer (e.g. 1130, 1140, 1150) requests and/or receives visual information from the visual information creator/producer (1100). These follow-up plans may have similar or identical set of values for their respective metadata fields, with an exception of a plan expiration condition term which may have a new starting point at the time of a follow-up plan's creation. If a particular visual information requester/viewer (e.g. 1120 or 1130) is no longer associated with an active incentive plan, as is the case at a third stage (T3) and a fourth stage (T4) in FIG. 11, then a portion of the subsequently-generated credit values which may have been destined to the particular visual information requester/viewer (e.g. 1120 or 1130) prior to the incentive plan disassociation is now given to the visual information creator/producer (1100). This concept is demonstrated with crossed-out visual information requester/viewer (e.g. 1120 or 1130) and recalculated credit assignment to the visual information creator/producer (1100) in the third stage (T3) and the fourth stage (T4) in FIG. 11.

In a preferred embodiment of the invention, the plan expiration condition term for each incentive plan (e.g. initial or follow-up incentive plans) may be contingent upon a number of subsequent follow-up incentive plans. In another embodiment of the invention, the plan expiration condition term may be contingent upon a fixed time period after activation of a relevant incentive plan. Some incentive plans with a relatively short life prior to expiration may be more favorable to at least some visual information creators/producers. In contrast, incentive plans with a longer life before expiration may be more favorable to at least some visual information requesters/viewers. Unreasonable incentive plans with excessively short or long life prior to expiration may simply be unpopular with both visual information requesters/viewers and creators/producers. Such unreasonable incentive plans may simply end up attracting less peers, thereby resulting in fewer follow-up incentive plans and less motivation to provide visual feed in the first place.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computerized system for peer-to-peer capturing and sharing of real-time visual information based on incentives, the computerized system comprising:
   a visual-information-capturing device which captures, creates, or produces the real-time visual information incorporating rich visual information metadata;
   a visual-information-displaying device which receives the real-time visual information from the visual-information-capturing device, generates a visual information viewer's adjustment request to adjust a current position, a lens direction, a lens orientation, a lens angle, a moving direction, or a moving speed of the visual-information-capturing device, creates an incentive credit for complying with the visual information viewer's adjustment request, and requests an incentive plan from an incentive service platform;
   the incentive service platform for providing and modifying the incentive plan with the visual information viewer's adjustment request and the incentive credit embedded in the rich visual information metadata for capturing and adjusting the real-time visual information by a visual information producer, wherein the visual information viewer's adjustment request in the incentive plan motivates a change in the current position, the lens direction, the lens orientation, the lens angle, the moving direction, or the moving speed of the visual-information-capturing device relative to the real-time visual information being captured by the visual information producer by providing the incentive credit for making the change, and wherein the incentive plan is transmitted to the visual-information-capturing device;
   a computer-readable medium or a memory unit to store the incentive service platform; and
   a CPU operatively connected to the computer-readable medium or the memory unit to execute the incentive service platform.

2. The computerized system of claim 1, wherein the visual-information-capturing device is a mobile phone embedded with a camcorder or a camera, a mobile camera with a wireless connection, a fixed position camera with a network connection, or a mobile camcorder with a wireless connection.

3. The computerized system of claim 1, wherein the visual-information-capturing device further comprises a network interface block, an incentive plan display and selection interface block, a metadata display unit, a visual metadata block, and a visual-information-capturing block.

4. The computerized system of claim 1, wherein the incentive service platform further comprises an incentive plan creation and listing module, an incentive plan matching module, a visual information summary and metadata posting and listing module, and an incentive credit processing module.

5. The computerized system of claim 1, wherein the visual-information-displaying device is a personal computer (PC), a television, or a video phone (e.g. a mobile phone capable of playing videos).

6. The computerized system of claim 1, wherein the incentive plan specifies desired, proposed, or requested rich visual metadata from the visual information viewer who requests a creation of the incentive plan to the incentive service platform via the visual-information-displaying device.

7. The computerized system of claim 6, wherein the desired, proposed, or requested rich visual metadata formulated in the incentive plan is transmitted to a visual information producer who use the visual-information-capturing device to provide visual information conforming to the desired, proposed, or requested rich visual metadata.

8. The computerized system of claim 7, wherein the visual information producer is allowed to adjust at least some of the desired, proposed, or requested rich visual metadata.

9. The computerized system of claim 1, further comprising a visual information hosting service which is capable of storing a plurality of visual information associated with a plurality of incentive plans.

10. The computerized system of claim 1, wherein the rich visual metadata comprises viewpoint description data, optimal parameter and commentary data, or identification data.

11. A method for peer-to-peer capturing and sharing of visual information based on incentives, the method comprising:
   generating a visual information viewer's adjustment request to adjust a current position, a lens direction, a lens orientation, a lens angle, a moving direction, or a moving speed of a visual-information-capturing device controlled by a visual information producer, wherein the visual information viewer's adjustment request is generated from a visual-information-displaying device;
   creating an incentive credit for complying with the visual information viewer's adjustment request, wherein the incentive credit is controlled by the visual information viewer via the visual-information-displaying device;
   transmitting the visual information viewer's adjustment request and the incentive credit to an incentive service platform from the visual-information-displaying device;
   requesting creation of an incentive plan from the incentive service platform;
   generating the incentive plan from the incentive service platform executed on a CPU and a memory unit of a computer server, wherein the incentive plan embeds the visual information viewer's adjustment request and the incentive credit in rich visual information metadata, and wherein the information viewer's adjustment request in the incentive plan motivates a change in the current position, the lens direction, the lens orientation, the lens angle, the moving direction, or the moving speed of the visual-information-capturing device relative to the real-time visual information being captured by the visual information producer by providing the incentive credit for making the change;
   transmitting the incentive plan to the visual information producer who is capable of capturing, creating, or producing the real-time visual information;
   transmitting an acceptance of the incentive plan or a negotiation offer from the visual information producer to the visual information viewer;
   capturing, creating, or producing the real-time visual information with the visual-information-capturing device by the visual information producer to comply with the visual information viewer's adjustment request of the lens direction, the lens orientation, the lens angle, the moving direction, or the moving speed of the visual-information-capturing device, wherein the visual information viewer's adjustment request is embedded in the rich visual information metadata displayed on a menu screen of the visual-information-capturing device; and
   transmitting the real-time visual information to a visual information hosting service or the visual information viewer.

12. The method of claim 11, further comprising a step of sending an incentive credit to the visual information producer when the real-time visual information is satisfactory to the visual information viewer.

13. The method of claim 11, wherein the rich visual information metadata comprises specific visual information-related requirements to be fulfilled by the visual information producer during capturing, creating, or producing the real-time visual information.

14. The method of claim 11, wherein the incentive plan includes one or more follow-up incentive plans representing a negotiated incentive plan with the visual information producer, wherein the one or more follow-up incentive plans incorporate visual adjustment requests by the visual information requestor or viewer to the real-time visual information provided by the visual information producer.

15. The method of claim 11, wherein the incentive plan includes a follow-up incentive plan representing a second visual information viewer's request to access the real-time visual information, wherein the one or more follow-up incentive plans include their own incentive credits.

* * * * *